US007346018B2

(12) United States Patent
Holtzman et al.

(10) Patent No.: US 7,346,018 B2
(45) Date of Patent: Mar. 18, 2008

(54) MARGIN CONTROL IN A DATA COMMUNICATION SYSTEM

(75) Inventors: Jack M. Holtzman, San Diego, CA (US); Gang Bao, San Diego, CA (US); David Puig Oses, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1010 days.

(21) Appl. No.: 10/346,292

(22) Filed: Jan. 16, 2003

(65) Prior Publication Data

US 2004/0141460 A1 Jul. 22, 2004

(51) Int. Cl.
*H04Q 7/34* (2006.01)

(52) U.S. Cl. ...................................... 370/311; 455/522

(58) Field of Classification Search ................ 370/311; 455/522

See application file for complete search history.

(56) References Cited

U.S. PATENT DOCUMENTS

2002/0028691 A1 3/2002 Moulsley et al.
2004/0043784 A1* 3/2004 Czaja et al. ................ 455/522
2004/0132405 A1* 7/2004 Kitazawa et al. .......... 455/13.4
2004/0142715 A1* 7/2004 Oses .......................... 455/522
2004/0252670 A1* 12/2004 Rong et al. ................. 370/343
2005/0111376 A1* 5/2005 Raghothaman et al. ..... 370/252

FOREIGN PATENT DOCUMENTS

WO 0019634 A1 4/2000
WO WO 01/01603 A1 * 1/2001
WO 0191322 A1 9/2007

* cited by examiner

*Primary Examiner*—Melvin Marcelo
(74) *Attorney, Agent, or Firm*—Dawell Scott Juneau; Thomas R. Rouse

(57) ABSTRACT

Techniques for improved margin control in a data communication system are disclosed. In one aspect, margin is adjusted in response to a first subpacket error rate. In another aspect, margin is further adjusted in response to an overall packet error rate. In yet another aspect, the first subpacket error rate is adjusted in response to an overall packet error rate. Various other aspects are also presented. These aspects have the benefit of responsive margin control when the overall packet error rate is relatively low, resulting in improved data throughput and increased system capacity.

43 Claims, 9 Drawing Sheets

MARGIN CONTROL IN A DATA COMMUNICATION SYSTEM

FIELD

The present invention relates generally to communications, and more specifically to a novel and improved method and apparatus for margin control in a data communication system.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named standards, the available spectrum is shared simultaneously among a number of users, and techniques such as power control and soft handoff are employed to maintain sufficient quality to support delay-sensitive services, such as voice. Data services are also available. More recently, systems have been proposed that enhance the capacity for data services by using higher order modulation, very fast feedback of Carrier to Interference ratio (C/I) from the mobile station, very fast scheduling, and scheduling for services that have more relaxed delay requirements. An example of such a data-only communication system using these techniques is the high data rate (HDR) system that conforms to the TIA/EIA/IS-856 standard (the IS-856 standard).

In contrast to the other above named standards, an IS-856 system uses the entire spectrum available in each cell to transmit data to a single user at one time, selected based on link quality. In so doing, the system spends a greater percentage of time sending data at higher rates when the channel is good, and thereby avoids committing resources to support transmission at inefficient rates. The net effect is higher data capacity, higher peak data rates, and higher average throughput.

Systems can incorporate support for delay-sensitive data, such as voice channels or data channels supported in the IS-2000 standard, along with support for packet data services such as those described in the IS-856 standard. One such system is described in a proposal submitted by LG Electronics, LSI Logic, Lucent Technologies, Nortel Networks, QUALCOMM Incorporated, and Samsung to the 3rd Generation Partnership Project 2 (3GPP2). The proposal is detailed in documents entitled "Updated Joint Physical Layer Proposal for 1×EV-DV", submitted to 3GPP2 as document number C50-20010611-009, Jun. 11, 2001; "Results of L3NQS Simulation Study", submitted to 3GPP2 as document number C50-20010820-011, Aug. 20, 2001; and "System Simulation Results for the L3NQS Framework Proposal for cdma2000 1×EV-DV", submitted to 3GPP2 as document number C50-20010820-012, Aug. 20, 2001. These, and related documents generated subsequently, are hereinafter referred to as the 1×EV-DV proposal.

A system such as the one described in the 1×EV-DV proposal generally comprises channels of four classes: overhead channels, dynamically varying IS-95 and IS-2000 channels, a Forward Packet Data Channel (F-PDCH), and some spare channels. The overhead channel assignments vary slowly, they may not change for months. They are typically changed when there are major network configuration changes. The dynamically varying IS-95 and IS-2000 channels are allocated on a per call basis or are used for IS-95, or IS-2000 Release 0 through B packet services. Typically, the available base station power remaining after the overhead channels and dynamically varying channels have been assigned is allocated to the F-PDCH for remaining data services. The F-PDCH may be used for data services that are less sensitive to delay while the IS-2000 channels are used for more delay-sensitive services.

The F-PDCH, similar to the traffic channel in the IS-856 standard, is used to send data at the highest supportable data rate to one user in each cell at a time. In IS-856, the entire power of the base station and the entire space of Walsh functions are available when transmitting data to a mobile station. However, in the proposed 1×EV-DV system, some base station power and some of the Walsh functions are allocated to overhead channels and existing IS-95 and cdma2000 services. The data rate that is supportable depends primarily upon the available power and Walsh codes after the power and Walsh codes for the overhead, IS-95, and IS-2000 channels have been assigned. The data transmitted on the F-PDCH is spread using one or more Walsh codes.

In the 1×EV-DV proposal, the base station generally transmits to one mobile station on the F-PDCH at a time, although many users may be using packet services in a cell. (It is also possible to transmit to two or more users, by scheduling transmissions for the two or more users and allocating power and/or Walsh channels to each user appropriately.) Mobile stations are selected for forward link transmission based upon some scheduling algorithm.

In a system similar to IS-856 or 1×EV-DV, scheduling is based in part on channel quality feedback from the mobile stations being serviced. For example, in IS-856, mobile stations estimate the quality of the forward link and compute a transmission rate expected to be sustainable for the current conditions. The desired rate from each mobile station is transmitted to the base station. The scheduling algorithm may, for example, select a mobile station for transmission that supports a relatively higher transmission rate in order to make more efficient use of the shared communication channel. As another example, in a 1×EV-DV system, each mobile station transmits a Carrier-to-Interference (C/I) estimate as the channel quality estimate. The scheduling algorithm is used to determine the mobile station selected for transmission, as well as the appropriate rate and transmission format in accordance with the channel quality.

Channel quality estimate accuracy is important for optimal scheduling and transmission leading to efficient use of the shared channel. Channel quality estimate accuracy can be affected by a number of factors, several examples of which follow. Since current estimates are used to determine future transmission, intervening changes in the channel may affect the usefulness of the estimate. In fast fading channel environments, this effect may more pronounced. Limitations in the measuring process may also affect accuracy. Channel estimate accuracy can also be degraded if errors are introduced when transmitting the estimates on the reverse link.

One technique for addressing these issues is to introduce a margin to offset uncertainty in the channel estimate. The margin is used to make the choice of transmission rate and format more conservative to compensate for the uncertainty, and can be adapted dynamically to adjust to changing channel conditions. One example of an outer control loop using margin is disclosed in co-pending U.S. patent application Ser. No. 10/136,906, entitled "IMPROVED OUTER-LOOP SCHEDULING DESIGN FOR COMMUNICATION SYSTEMS WITH CHANNEL QUALITY FEEDBACK MECHANISMS", filed Apr. 30, 2002, assigned to the assignee of the present invention (hereinafter the '906 application). This technique uses a control loop, based on identified packet errors, to adjust the margin such that a desired packet error rate is achieved. However, if the packet error rate is very low, the loop may not adjust quickly.

Efficiency of the shared communication channel can be improved when channel quality feedback is reliable and margin is adapted effectively for changing channel environments. There is therefore a need in the art for improved margin control in a data communication system.

SUMMARY

Embodiments disclosed herein address the need for improved margin control in a data communication system. In one aspect, margin is adjusted in response to a first subpacket error rate. In another aspect, margin is further adjusted in response to an overall packet error rate. In yet another aspect, the first subpacket error rate is adjusted in response to an overall packet error rate. Various other aspects are also presented. These aspects have the benefit of responsive margin control when the overall packet error rate is relatively low, resulting in improved data throughput and increased system capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
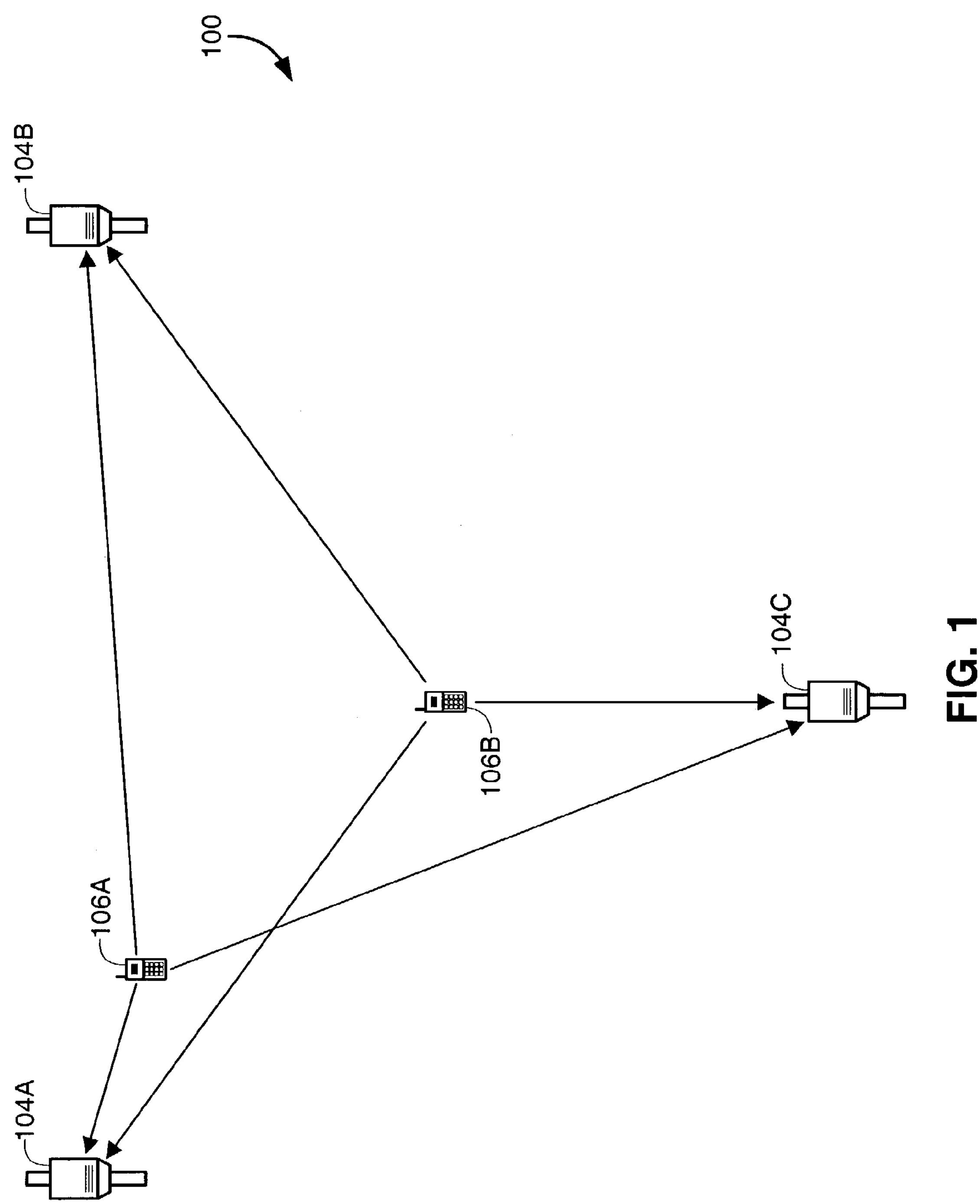
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification, the 1×EV-DV proposal). In an alternative embodiment, system 100 may also deploy any wireless standard or design other than a CDMA system, such as a GSM system.

For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or Node B. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

As described above, a wireless communication system 100 may support multiple users sharing the communication resource simultaneously, such as an IS-95 system, may allocate the entire communication resource to one user at time, such as an IS-856 system, or may apportion the communication resource to allow both types of access. A 1×EV-DV system is an example of a system that divides the communication resource between both types of access, and dynamically allocates the apportionment according to user demand. Following is a brief background on how the communication resource can be allocated to accommodate various users in both types of access systems. Power control is described for simultaneous access by multiple users, such as IS-95 type channels. Rate determination and scheduling is discussed for time-shared access by multiple users, such as an IS-856 system or the data-only portion of a 1×EV-DV type system. Note that "outer loop" is a term used in the art relating to both access types, but it's meaning may be different in the two contexts.

Capacity in a system such as an IS-95 CDMA system is determined in part by interference generated in transmitting signals to and from various users within the system. A feature of a typical CDMA system is to encode and modulate signals for transmission to or from a mobile station such that the signals are seen as interference by other mobile stations. For example, on the forward link, the quality of the channel between a base station and one mobile station is determined in part by other user interference. To maintain a desired performance level of communication with the mobile station, the transmit power dedicated to that mobile station must be sufficient to overcome the power transmitted to the other mobile stations served by the base station, as well as other interference experienced in that channel. Thus, to increase capacity, it is desirable to transmit the minimum power required to each mobile station served.

Forward link power control is described for discussion purposes only. Those of skill in the art will readily adapt power control techniques for the reverse link as well. In a typical CDMA system, when multiple mobile stations are transmitting to a base station, it is desirable to receive a plurality of mobile station signals at the base station at a normalized power level. Thus, for example, a reverse link power control system may regulate the transmit power from each mobile station such that signals from nearby mobile stations do not overpower signals from farther away mobile stations. As with the forward link, keeping the transmit power of each mobile station at the minimum power level required to maintain the desired performance level allows for capacity to be optimized, in addition to other benefits of power savings such as increased talk and standby times, reduced battery requirements, and the like.

Capacity in a typical CDMA system, such as IS-95, is constrained by other-user interference. Other-user interference can be mitigated through use of power control. The overall performance of the system, including capacity, voice quality, data transmission rates and throughput, is dependant upon stations transmitting at the lowest power level to sustain the desired level of performance whenever possible. To accomplish this, various power control techniques are known in the art.

One class of techniques includes closed loop power control. For example, closed loop power control may be deployed on the forward link. Such systems may employ an inner and outer power control loop in the mobile station. An outer loop determines a target received power level according to a received error rate. For example, a target frame error rate of 1% may be pre-determined as the desired error rate. The outer loop may update the target received power level at a relatively slow rate, such as once per frame or block. In response, the inner loop then sends up or down power control messages to the base station until received power meets the target. These inner loop power control commands occur relatively frequently, so as to quickly adapt the transmitted power to the level necessary for efficient communication. As described above, keeping the transmit power for each mobile station at the lowest level reduces other user interference seen at each mobile station and allows remaining available transmit power to be reserved for other purposes. In a system such as IS-95, the remaining available transmit power can be used to support communication with additional users. In a system such as 1×EV-DV, the remaining available transmit power can be used to support additional users, or to increase the throughput of the data-only portion of the system. The outer loop or inner loop for power control just described may be different than similarly labeled control loops defined for use with data-only channels, described below.

In a "data-only" system, such as IS-856, or in the "data-only" portion of a system, such as 1×EV-DV, a control loop may be deployed to govern the transmission from the base station to a mobile station in a time-shared manner. For clarity, in the following discussion, transmission to one mobile station at a time is described. This is to distinguish from a simultaneous access system, an example of which is IS-95, or various channels in a cdma200 or 1×EV-DV system. Two notes are in order at this point.

First, the term "data-only" or "data channel" may be used to distinguish a channel from IS-95 type voice or data channels (i.e. simultaneous access channels using power control, as described above) for clarity of discussion only. It will be apparent to those of skill in the art that data-only or data channels described herein can be used to transmit data of any type, including voice (i.e. voice over Internet Protocol, or VOIP). The usefulness of any particular embodiment for a particular type of data may be determined in part by the throughput requirements, latency requirements, and the like. Those of skill in the art will readily adapt various embodiments, combining either access type with parameters selected to provide the desired levels of latency, throughput, quality of service, and the like.

Second, a data-only portion of a system, such as that described for 1×EV-DV, which is described as time-sharing the communication resource, can be adapted to provide access to more than one user simultaneously. Examples of this are detailed below. In examples herein where the communication resource is described as time-shared to provide communication with one mobile station or user during a certain period, those of skill in the art will readily adapt those examples to allow for time-shared transmission to or from more than one mobile station or user within that time period.

A typical data communication system may include one or more channels of various types. More specifically, one or more data channels are commonly deployed. It is also common for one or more control channels to be deployed, although in-band control signaling can be included on a data channel. For example, in a 1×EV-DV system, a Packet Data Control Channel (PDCCH) and a Packet Data Channel (PDCH) are defined for transmission of control and data, respectively, on the forward link.

Figure 2:
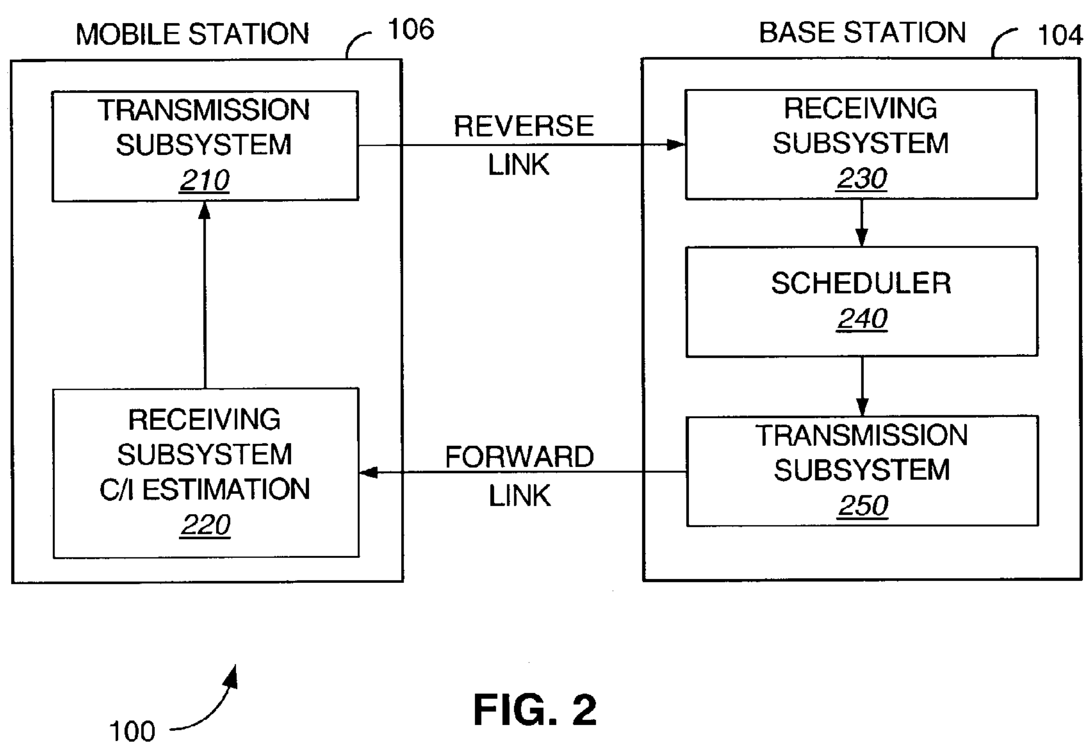
FIG. 2 depicts an example mobile station and base station configured in a system adapted for data communication.

FIG. 2 depicts an example mobile station 106 and base station 104 configured in a system 100 adapted for data communication. Base station 104 and mobile station 106 are shown communicating on a forward and a reverse link. Mobile station 106 receives forward link signals in receiving subsystem 220. A base station 104 communicating the forward data and control channels, detailed below, may be referred to herein as the serving station. An example receiving subsystem is detailed further below with respect to FIG. 3. A Carrier-to-interference (C/I) estimate is made for the forward link signal received from the serving base station. A C/I measurement is an example of a channel quality metric used as a channel estimate, and alternate channel quality metrics can be deployed in alternate embodiments. The C/I measurement is delivered to transmission subsystem 210, an example of which is detailed further below with respect to FIG. 3.

The transmission subsystem 210 delivers the C/I estimate over the reverse link where it is delivered to the serving base station. Note that, in a soft handoff situation, well known in the art, the reverse link signals transmitted from a mobile station may be received by a base station other than the serving base station. In that case, the C/I measurement may be delivered to the serving base station on an alternate network, for example, that used for coordinating soft handoff of mobile stations. For clarity, in this discussion, base station 104 is the serving base station and is also selected to receive the reverse link signal from mobile station 106. Receiving subsystem 230, in base station 104, receives the C/I information from mobile station 106.

Scheduler 240, in base station 104, is used to determine whether and how data should be transmitted to one or more mobile stations within the serving cell's coverage area. Any type of scheduling algorithm can be deployed within the scope of the present invention. One example is disclosed in U.S. patent application Ser. No. 08/798,951, entitled "METHOD AND APPARATUS FOR FORWARD LINK RATE SCHEDULING", filed Feb. 11, 1997, assigned to the assignee of the present invention.

In an example 1×EV-DV embodiment, a mobile station is selected for forward link transmission when the C/I measurement received from that mobile station indicates that data can be transmitted at a certain rate. It is advantageous, in terms of system capacity, to select a target mobile station such that the shared communication resource is always utilized at its maximum supportable rate. Thus, the typical target mobile station selected may be the one with the greatest reported C/I. Other factors may also be incorporated in a scheduling decision. For example, minimum quality of service guarantees may have been made to various users. It may be that a mobile station, with a relatively lower reported C/I, is selected for transmission to maintain a minimum data transfer rate to that user.

In the example 1×EV-DV system, scheduler 240 determines which mobile station to transmit to, and also the data rate, modulation format, and power level for that transmission. In an alternate embodiment, such as an IS-856 system, for example, a supportable rate/modulation format decision can be made at the mobile station, based on channel quality measured at the mobile station, and the transmit format can be transmitted to the serving base station in lieu of the C/I measurement. Those of skill in the art will recognize myriad combinations of supportable rates, modulation formats, power levels, and the like which can be deployed within the scope of the present invention. Furthermore, although in various embodiments described herein the scheduling tasks are performed in the base station, in alternate embodiments, some or all of the scheduling process may take place in the mobile station.

Scheduler 240 directs transmission subsystem 250 to transmit to the selected mobile station on the forward link using the selected rate, modulation format, power level, and the like.

In the example embodiment, messages on the control channel, or PDCCH, are transmitted along with data on the data channel, or PDCH. The control channel can be used to identify the recipient mobile station of the data on the PDCH, as well as identifying other communication parameters useful during the communication session. A mobile station should receive and demodulate data from the PDCH when the PDCCH indicates that mobile station is the target of the transmission. The mobile station responds on the reverse link following the receipt of such data with a message indicating the success or failure of the transmission. In the example embodiment, an Acknowledged (ACK) message is sent when a packet of data is received correctly, and a Not Acknowledged (NAK) message is sent when an error is detected.

Retransmission techniques are commonly deployed in data communication systems. In such a system, a portion of the data can be retransmitted when a NAK message has indicated that portion has not been successfully received. Retransmission schemes can be deployed at various signaling layers. In the example embodiment, a retransmission process is deployed within the physical layer.

An example physical layer retransmission process is given in the 1×EV-DV standard. Data is partitioned into packets. In the example embodiment, a packet may be transmitted up to four times. Each attempted transmission of a packet is referred to herein as a subpacket. A subpacket is transmitted to a target mobile station on the PDCH, the identity of which is indicated on the PDCCH. If the subpacket is received correctly (as determined through one or more various encoding and decoding techniques, examples of which are well known in the art), an ACK message is sent to the base station in response. If the subpacket is not received correctly, a NAK message is sent in response. The base station may retransmit the packet, i.e., a new subpacket, until a predetermined limit of retransmissions has been reached (in this example, three). If any of the subpackets are received correctly, the packet transmission has been successful. If all the subpackets were transmitted without receiving an ACK, a packet error has occurred.

Each subpacket transmission sends the information contained in the packet. The energy received by the mobile station for a subpacket can be combined with the energy received for one or more of the previously transmitted subpackets. For example, if a first subpacket is received in error, the energy received in the second subpacket (a retransmission) can be combined with the energy in the first subpacket to increase the likelihood of successful decoding. Thus, even without altering any of the transmission parameters, the probability of correctly receiving a subpacket will increase with respect to the probability of receiving the prior subpacket.

In addition, redundancy can be incorporated in a subpacket transmission. The redundancy included in each of the subpacket transmissions does not need to be identical from one subpacket transmission to the next. For example, consider an embodiment in which a total of four subpacket transmissions are allowed for a single packet. The packet can be divided into four segments, labeled A, B, C, and D. Each subpacket can include the contents of the packet, plus a redundant transmission of one of the segments. The first subpacket may comprise the sequence A, B, C, D, D. The second subpacket, if required, may comprise the sequence A, B, C, C, D. The third subpacket, if required, may comprise the sequence A, B, B, C, D. The fourth subpacket, if required, may comprise the sequence A, A, B, C, D. In this example, if all four subpacket transmissions are required, each subpacket segment will have been transmitted five times, and the energy can be accumulated for all of them. In an alternative embodiment, an encoding technique may include redundant information based on all the information in the packet, e.g., appending parity bits generated using a block code. Those of skill in the art will recognize that the redundant information, e.g. parity information, can be identical across subpackets, or can be unique across one or more subpackets. Any conceivable packet encoding and transmission techniques can be deployed within the scope of the present invention.

The transmission of packets can be performed using parameters selected to yield desired performance characteristics. For example, an overall packet error rate may be desired. Or, as described further below, it may be desirable to tailor the first subpacket error rate. An outer control loop, such as described above for a data system, can be employed to drive one or more performance measurements to their desired targets. Those of skill in the art will recognize that various performance measurements, such as error rates, that can be generated using such systems, all of which fall within the scope of the present invention. Various example embodiments of control loops targeting various packet and/or subpacket error rates are detailed further below.

Figure 3:
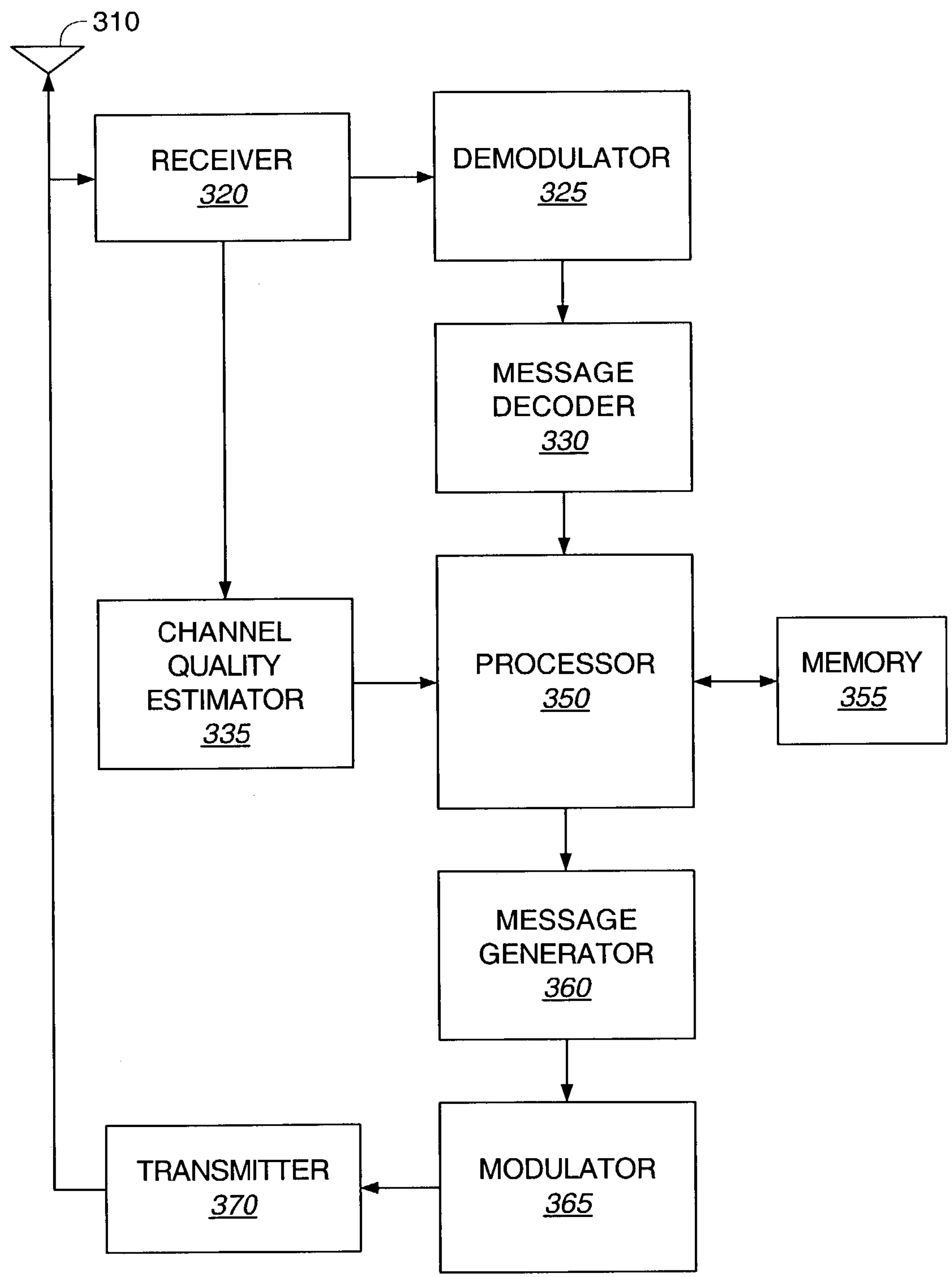
FIG. 3 is a block diagram of a wireless communication device, such as a mobile station or base station.

FIG. 3 is a block diagram of a wireless communication device, such as mobile station 106 or base station 104. The blocks depicted in this example embodiment will generally be a subset of the components included in either a base station 104 or mobile station 106. Those of skill in the art will readily adapt the embodiment shown in FIG. 3 for use in any number of base station or mobile station configurations.

Signals are received at antenna 310 and delivered to receiver 320. Receiver 320 performs processing according to one or more wireless system standards, such as the standards listed above. Receiver 320 performs various processing such as Radio Frequency (RF) to baseband conversion, amplification, analog to digital conversion, filtering, and the like. Various techniques for receiving are known in the art. Receiver 320 may be used to measure channel quality of the forward or reverse link, when the device is a mobile station or base station, respectively, although a separate channel quality estimator 335 is shown for clarity of discussion, detailed below.

Signals from receiver 320 are demodulated in demodulator 325 according to one or more communication standards. In an example embodiment, a demodulator capable of demodulating 1×EV-DV signals is deployed. In alternate embodiments, alternate standards may be supported, and embodiments may support multiple communication formats. Demodulator 330 may perform RAKE receiving, equalization, combining, deinterleaving, decoding, and various other functions as required by the format of the received signals. Various demodulation techniques are known in the art. In a base station 104, demodulator 325 will demodulate according to the reverse link. In a mobile station 106, demodulator 325 will demodulate according to the forward link. Both the data and control channels described herein are examples of channels that can be received and demodulated in receiver 320 and demodulator 325. Demodulation of the forward data channel will occur in accordance with signaling on the control channel, as described above.

Message decoder 330 receives demodulated data and extracts signals or messages directed to the mobile station 106 or base station 104 on the forward or reverse links, respectively. Message decoder 330 decodes various messages used in setting up, maintaining and tearing down a call (including voice or data sessions) on a system. Messages may include channel quality indications, such as C/I measurements, ACK/NAK messages, or control channel messages used for demodulating the forward data channel. Various other message types are known in the art and may be specified in the various communication standards being supported. The messages are delivered to processor 350 for use in subsequent processing. Some or all of the functions of message decoder 330 may be carried out in processor 350, although a discrete block is shown for clarity of discussion Alternatively, demodulator 325 may decode certain information and send it directly to processor 350 (a single bit message such as an ACK/NAK or a power control up/down command are examples).

Channel quality estimator 335 is connected to receiver 320, and used for making various power level estimates for use in procedures described herein, as well as for use in various other processing used in communication, such as demodulation. In a mobile station 106, C/I measurements may be made. In a base station 104 or mobile station 106, signal strength estimations, such as received pilot power can be made. Channel quality estimator 335 is shown as a discrete block for clarity of discussion only. It is common for such a block to be incorporated within another block, such as receiver 320 or demodulator 325. Various types of signal strength estimates can be made, depending on which signal or which system type is being estimated. In general, any type of channel quality metric estimation block can be deployed in place of channel quality estimator 335 within the scope of the present invention. In a base station 104, the channel quality estimates are delivered to processor 350 for use in scheduling, determining reliability of ACK/NAK messages, or determining reliability of C/I messages, as described further below. An example of a signal strength estimate is an Energy per Chip over total noise density (Ec/Nt) measurement, the use of which is described in various examples below.

Signals are transmitted via antenna 310. Transmitted signals are formatted in transmitter 370 according to one or more wireless system standards, such as those listed above. Examples of components that may be included in transmitter 370 are amplifiers, filters, digital-to-analog (D/A) converters, radio frequency (RF) converters, and the like. Data for transmission is provided to transmitter 370 by modulator 365. Data and control channels can be formatted for transmission in accordance with a variety of formats. Data for transmission on the forward link data channel may be formatted in modulator 365 according to a rate and modulation format indicated by a scheduling algorithm in accordance with a C/I or other channel quality measurement. A scheduler, such as scheduler 240, described above, may reside in processor 350. Similarly, transmitter 370 may be directed to transmit at a power level in accordance with the scheduling algorithm. Examples of components which may be incorporated in modulator 365 include encoders, interleavers, spreaders, and modulators of various types.

Message generator 360 may be used to prepare messages of various types, as described herein. For example, C/I messages may be generated in a mobile station for transmission on the reverse link. Various types of control messages may be generated in either a base station 104 or mobile station 106 for transmission on the forward or reverse links, respectively.

Data received and demodulated in demodulator 325 may be delivered to processor 350 for use in voice or data communications, as well as to various other components. Similarly data for transmission may be directed to modulator 365 and transmitter 370 from processor 350. For example, various data applications may be present on processor 350, or on another processor included in the wireless communication device 104 or 106 (not shown). A base station 104 may be connected, via other equipment not shown, to one or more external networks, such as the Internet (not shown). A mobile station 106 may include a link to an external device, such as a laptop computer (not shown).

Processor 350 may be a general-purpose microprocessor, a digital signal processor (DSP), or a special-purpose processor. Processor 350 may perform some or all of the functions of receiver 320, demodulator 325, message decoder 330, channel quality estimator 335, message generator 360, modulator 365, or transmitter 370, as well as any other processing required by the wireless communication device. Processor 350 may be connected with special-purpose hardware to assist in these tasks (details not shown). Data or voice applications may be external, such as an externally connected laptop computer or connection to a network, may run on an additional processor within wireless communication device 104 or 106 (not shown), or may run on processor 350 itself. Processor 350 is connected with memory 355, which can be used for storing data as well as instructions for performing the various procedures and methods described herein. Those of skill in the art will recognize that memory 355 may be comprised of one or more memory components of various types, that may be embedded in whole or in part within processor 350.

The various example embodiments of control loops, described herein, rely on feedback from the mobile station to the base station. For example, channel quality indicators (such as C/I measurements or rate requests in an HDR-type system), ACK messages, and NAK messages, are received at the base station in response to the transmission of control and data channels on the forward link. Due to varying channel conditions, a variety of issues may arise that affect the reliability of this feedback. Four of these issues are addressed below, with example solutions for mitigating their effects.

The first issue is that C/I measurements, transmitted on the reverse link, may be decoded incorrectly at the base station. In a relatively poor channel environment, an indicator of low C/I may be decoded incorrectly as a high C/I value. In this case, the base station may schedule forward link data transmissions at an unreasonably high rate for the actual channel condition. As a result, the mobile station will be unlikely to receive the forward link transmissions, including retransmissions, and thus the system performance will be reduced. In an example embodiment, a full C/I measurement (i.e. a multiple bit value) is sent only periodically, with incremental adjustments made in between using more efficient up and down commands (i.e. single bit transmissions). In this example, the problem is compounded since the up or down commands may not adjust a decoding error quickly.

A solution to this first issue is to deploy a filter to smooth out unusual C/I jumps reported by the mobile station. For example, a jump limit may be imposed between the prior C/I estimate and a new C/I estimate. In an embodiment using up/down commands in between period full C/I updates, the jump limit may be imposed between the value computed at the last up/down command and a newly received full C/I value. An example jump limit may be 3 dB. Another example jump limit may be a function of standard deviation of C/I estimates.

In addition to, or instead of, using a jump limit in updating C/I measurements, additional filtering may be deployed depending on characteristics of the channel. Since scheduled forward link transmissions are made based on past measurements of the channel, the measurements may be somewhat outdated. In a slow fading environment, it may be desirable for the mobile station to track the C/I measurements as they arrive, due to the relatively lower rate of change in channel quality, and thus relying on past estimates may be more appropriate. In a fast fading channel, rapid, and perhaps highly variable, changes may be reported in the C/I measurements. Relying on a past measurement may not be accurate for the present condition of the channel. In this environment, it may be desirable to filter the C/I measurements. This may be used to utilize the shared resource more efficiently by avoiding unsustainably high transfer rates in response to transient high C/I values. Various techniques for determining the rate of fading in a communication system are known in the art, and any technique can be deployed within the scope of the present invention.

Figure 4:
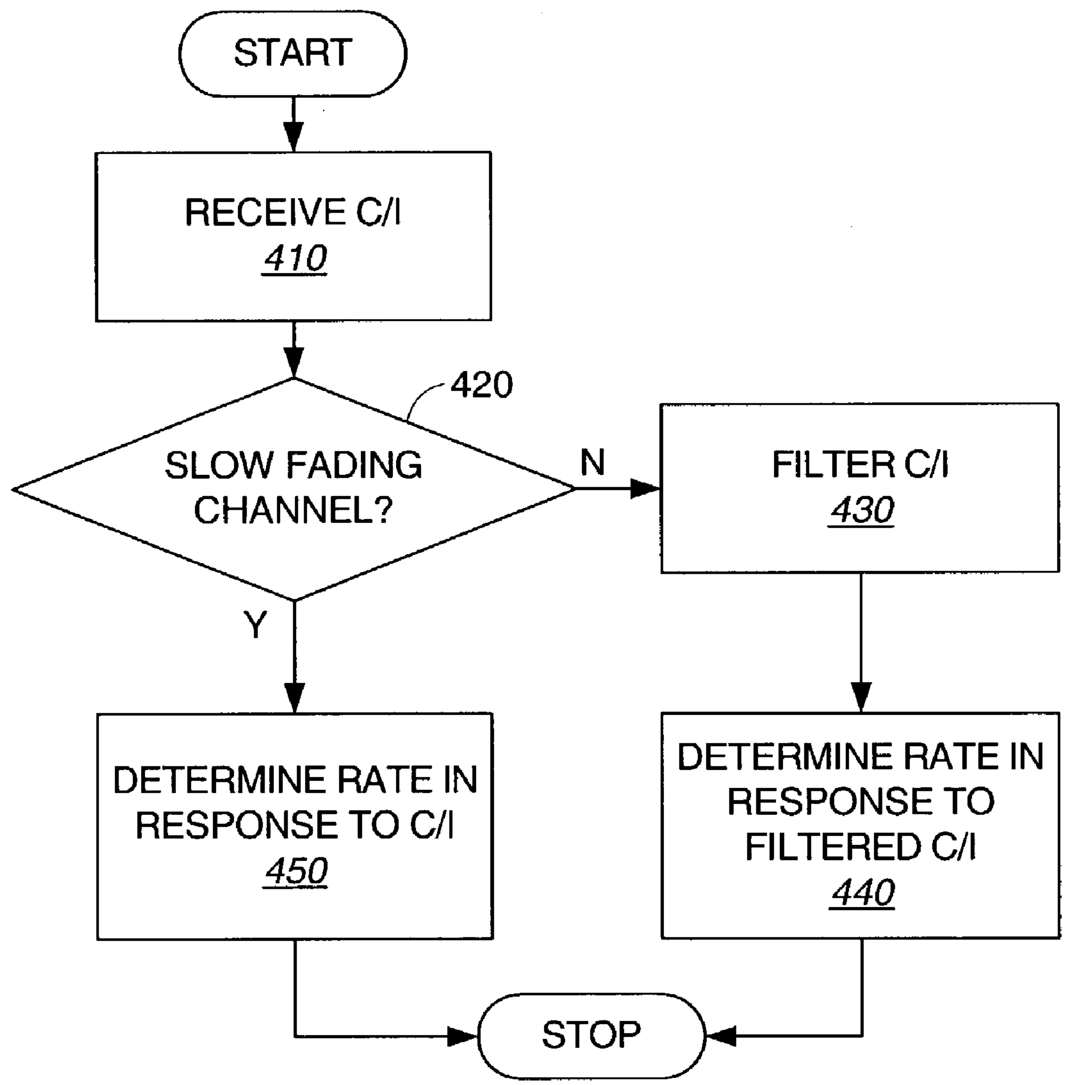
FIG. 4 depicts a flowchart of an example embodiment of a C/I filtering method.

FIG. 4 depicts a flowchart of an example embodiment of a C/I filtering method. The process starts in step 410, at which a C/I measurement is received. This method can be deployed with continuously updated full C/I measurements, or periodically reported full measurements with incremental updates. Proceed to decision block 420.

In decision block 420, if the channel is a slow fading channel, proceed to step 450. In step 450, a scheduling process can determine whether to transmit to a particular mobile station, the rate, and the modulation format in response to the C/I measurement. The C/I measurement may be jump limited prior to this determination, as described above. The process then stops.

In decision block 420, if the channel is a fast fading channel, proceed to step 430 and update a filter with the new C/I value. Various filtering techniques are well known in the art. Furthermore, a filter bank, including a number of filters, may be deployed. Curve fitting can be used with the plurality of filters to determine the appropriate C/I value. Proceed to step 440, and determine the rate and modulation format in response to the filtered C/I value. This may occur in a scheduler, as described above. Jump limits can also be deployed to the filtered C/I value (another form of filtering). Then the process stops.

The second issue arises from the possibility that the ACK/NAK channel may be unreliable. One cause for unreliability may be a power cap implemented at the mobile station. In general, a targeted Ec/Nt can keep the ACK/NAK detection error rate at a desired level (1%, for example). If the reverse link power is limited, this error rate can rise quickly if the target is greater than that permitted by the power cap. The dropped frame error rate will rise in proportion to the ACK error rate, since the base station will not retransmit a frame incorrectly received at the mobile station when the corresponding NAK sent on the reverse link is erroneously decoded as an ACK. On the other hand, the communication resource is not utilized efficiently when an erroneously decoded NAK causes the base station to retransmit an already correctly received packet.

Figure 5:
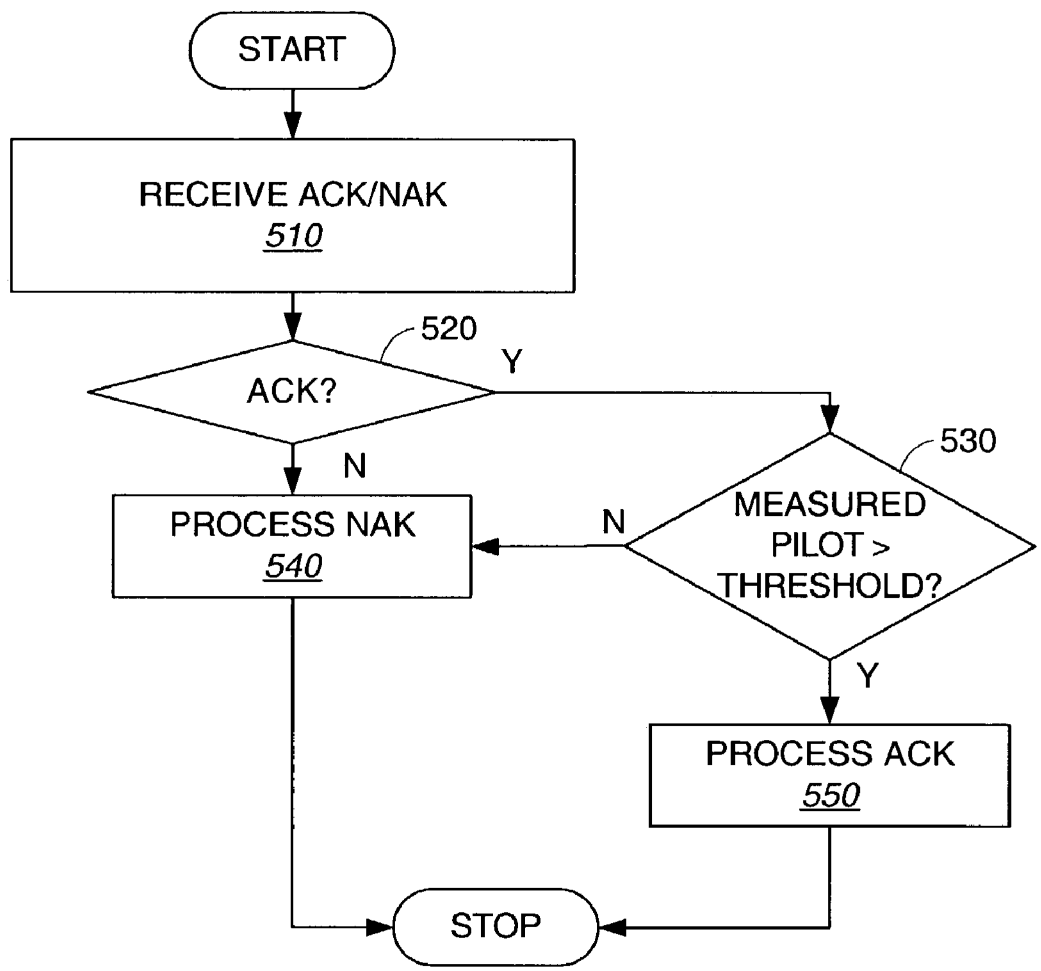
FIG. 5 depicts a flowchart of an example embodiment for increasing reliability of ACK/NAK messages.

FIG. 5 depicts a flowchart of an example embodiment for increasing reliability of ACK/NAK messages. The process starts in step 510, where an ACK or NAK message is received. Proceed to decision block 520. If a NAK is received, proceed to step 540 and process the NAK. Although the NAK may have been received incorrectly, the result of this error may be an unnecessary retransmit, but the frame error rate at the mobile station will not be negatively affected. Then the process stops.

In decision block 520, if an ACK is received, proceed to decision block 530. In decision block 530, the measured pilot from the mobile station is compared with a threshold. This measurement may be made in a channel quality estimator 335 incorporated in the base station, for example. If the pilot exceeds the threshold, the ACK is deemed to be reliable, and the process flows to step 550, where an ACK is processed. Then the process stops. If the threshold is not met by the measured pilot power, the ACK is deemed to be unreliable. Proceed to step 540 to process a NAK, as described above. Then the process stops. Thus, the quality of the reverse link channel is used to determine the reliability of ACK messages. Increased ACK error rates, in a power limited reverse link, for example, will not translate into a proportionate increase in frame error rate at the mobile station.

The third issue is also related to reverse link quality. C/I feedback (or rate requests, in an HDR-type system) may not be reliable when reverse link power is restricted. A method such as that depicted in FIG. 5 can be adapted to reject C/I measurements when the reverse link pilot power does not exceed a predetermined threshold. Thus, mobile stations without the requisite reverse power is insufficient (i.e., as measured in received pilot power) will not be scheduled for forward link transmission. Details are not shown in FIG. 5. Those of skill in the art will readily deploy such a scheme in view of the teaching herein.

Figure 6:
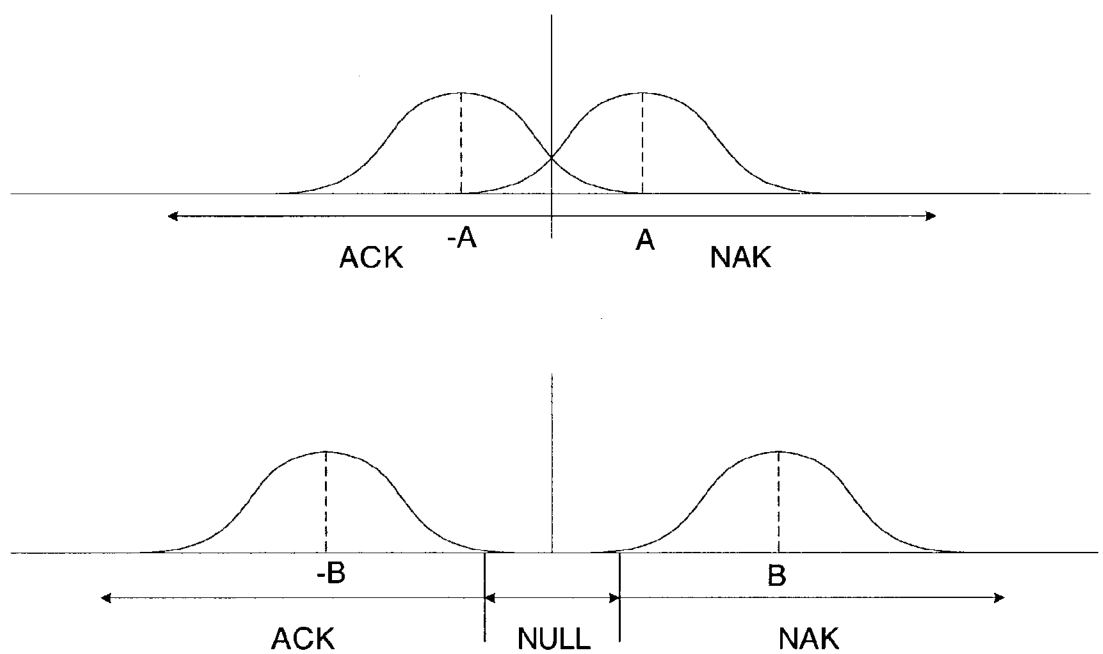
FIG. 6 illustrates the separation in received energy for two example ACK/NAK energy values.

The fourth issue arises from the recognition that there are actually three states of the ACK/NAK channel, where the third state is a NULL response. The forward link control channel is used to identify the mobile station targeted by the forward link data channel. If the mobile station does not correctly decode the control channel, it will not attempt to decode the data channel, which includes its directed data transmission. It will therefore not respond with either an ACK or a NAK message. The base station may need to reliably determine whether the control channel was received correctly, for example, when a control loop is deployed on the control channel. An example outer loop for controlling PDCCH transmission is described below, with respect to FIG. 8. In an example embodiment, a single bit is sent for the ACK/NAK message, with a positive value transmitted for a NAK, and a negative value transmitted for an ACK. FIG. 6 illustrates the separation in received energy for two example situations. In the first example, energy A is used to transmit a NAK, and −A indicates an ACK. In this example, the separation between A and −A is not sufficient to identify a NULL transmission, where neither value was transmitted. The second example shows energy B transmitted for a NAK, and −B transmitted for an ACK. It can be seen that the separation is great enough to identify a NULL with adequate reliability.

A solution to issue four is to transmit the ACK/NAK bit with sufficient power to identify the NULL state as well as the ACK and NAK states. If there is a limit to the power allocated to the ACK/NAK message, the message can be repeated. The base station can combine the repeated transmissions to make the ACK/NAK/NULL determination. For example, in a 1×EV-DV system, if the required Ec/Nt to detect ACK, NAK, and NULL is 10 dB higher than that required to detect ACK and NAK only, the traffic power to pilot power (T/P) ratio may be increased from −3 dB to 0 dB, and the ACK/NAK bit can be repeated up to 4 times.

As described above, the transmission rate and format may be determined in response to a received channel quality measurement, such as C/I. The available transmit power is allocated to one or more mobile stations during a time slot. In one embodiment, the PDCH is allocated to one user at a time. In an alternate embodiment, the transmit power can be split across more than one mobile station. When using margin, the rate and modulation format may be determined in response to the available transmit power and an adjusted quality metric (i.e. the received C/I—margin). Margin may be dynamically updated to produce a desired performance level, and different margin characteristics may be appropriate in different communication environments. For example, in a slow fading environment, a tighter margin can be used, since the channel estimate is more likely to remain valid from frame to frame. In a fast fading environment, a larger margin may be needed to offset the effects of a more rapidly changing channel.

Figure 7:
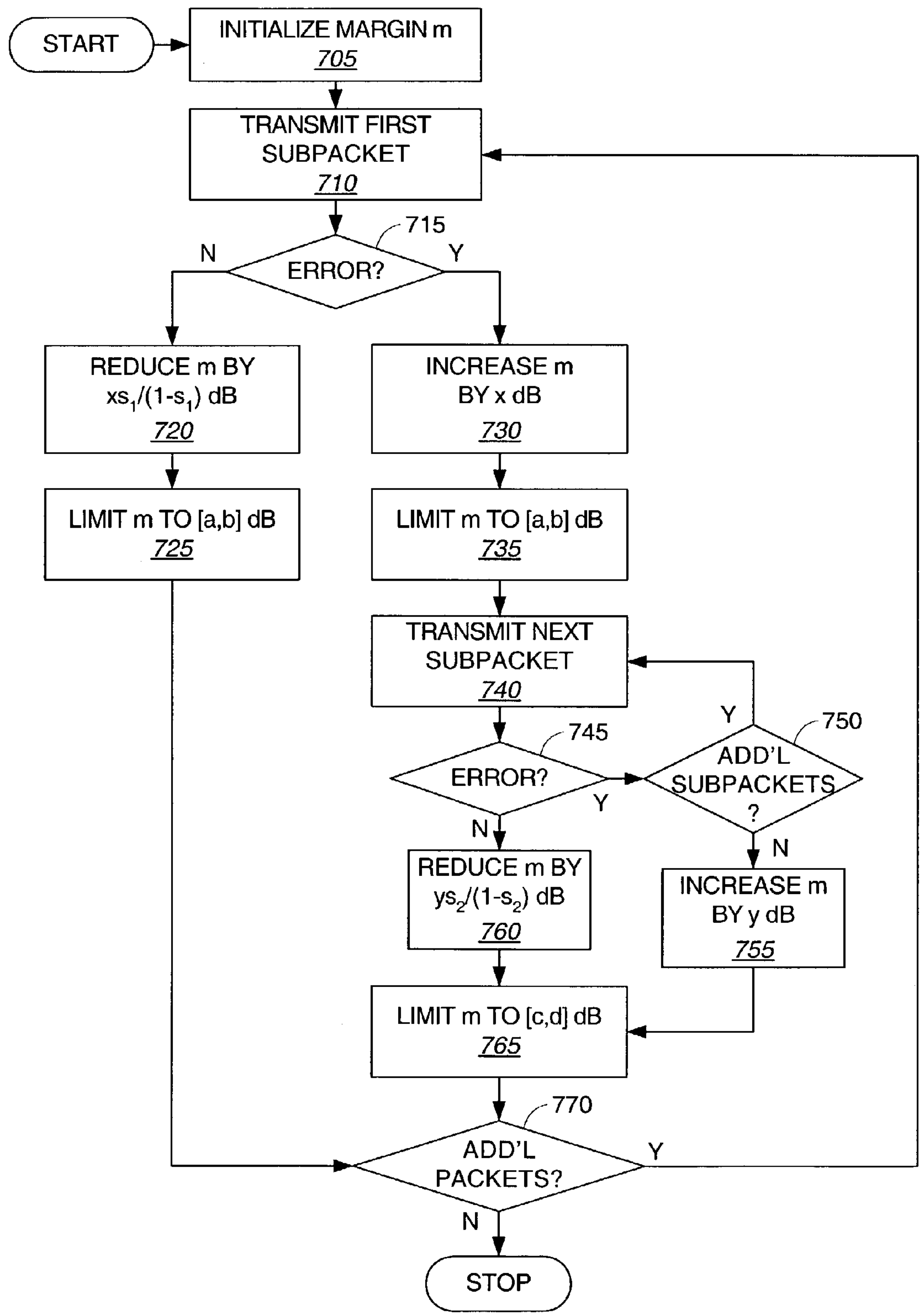
FIG. 7 depicts a flowchart of an example embodiment of an outer control loop.

FIG. 7 depicts a flowchart of an example embodiment of an outer control loop. The control loop is used to dynamically update a margin value, m, in response to feedback from a mobile station. The process may be parameterized through the use of several variables. Variable $s_1$ is the targeted first subpacket error rate. Variable $s_2$ is the targeted packet error rate. Variables a and b are lower and upper bounds, respectively, used to provide a window for limiting the instantaneous change in the margin, m, in association with first sub-packets. Variable x is a factor for scaling the amount of increase or reduction of m based on first subpacket feedback. Variable y is a factor for scaling the amount of increase or reduction of m based on subsequent subpacket feedback. Variables c and d are lower and upper bounds, respectively, used to provide a window for limiting the instantaneous change in the margin, m, for subsequent subpackets.

The use of two target error rates may be used to increase the sensitivity of the control loop in comparison with a single error rate. For example, a control loop, such as that described in the '906 application, may be updated in response to overall packet errors. A typical data communication system may be designed to have a very low packet error rate, perhaps achieved through retransmission protocols using multiple subpackets, as described above. Since the occurrence of a packet error is relatively rare, the loop may increase the margin very slowly. In certain circumstances, while the desired overall packet error rate is achieved, the number of retransmissions may be greater than necessary and therefore the channel is not used optimally. A slowly adapting loop may allow this situation to exist longer than desired.

Controlling the first subpacket error rate in addition to the overall packet error rate allows the loop to adapt quickly to changing channel environments. Reducing retransmissions allows the throughput to be maximized. For example, in a slow to medium fading environment, a final packet error rate of $10^{-4}$ may be set, which results in a relatively infrequent occurrence of a packet error. In such an environment, retransmissions can be reduced by use of a margin value that also provides a very low first subpacket error rate, thus increasing throughput. In a fast fading environment, attempting to keep the first subpacket error rate very low may require an excessively conservative margin value which lowers the data rate. Allowing additional retransmissions of subpackets at a higher data rate, by relaxing the first subpacket error rate, may actually increase throughput in a fast fading environment.

In the example of FIG. 7, a single loop is used to maintain a single margin value. This margin value can be used in determining the power for transmission on the control channel (i.e. the PDCCH), as well as the power, rate, and modulation format of transmission on the data channel (i.e. the PDCH). An offset may be introduced to differentiate between the use of m for the control channel and for the data channel. For example, an offset may be added to m for use in determining control channel power transmission levels, while m, unmodified, may be used in scheduling the data channel. The offset may be fixed, or updated dynamically in response to changing channel conditions. Those of skill in the art will recognize that any number of control loops may be deployed to maintain multiple margin values. Multiple margin values may be used to control one or more channels, as well as for independent control of various formats on a single channel. Examples of some of these various alternative embodiments are detailed below.

The process begins in step 705, where m is initialized. Any initialization procedure can be used to determine the initial value of m within the scope of the present invention. For example, the initialization value may be set to a predetermined value, or calculated in response to the current channel conditions, such as given by the most recent C/I value, or measurements of the reverse link power. Proceed to step 710.

In step 710, the first subpacket is transmitted on the data channel, and the proper corresponding control information is transmitted on the control channel. The rate, power, and format for the data channel is determined, in a scheduler, for example, in response to the current value of m, among other factors. Other factors may include the C/I measurement, service-level requirements of various mobile stations served by the base station, and other factors known in the art. Proceed to decision block 715.

In decision block 715, a response from the mobile station is received corresponding to the transmitted first subpacket. In the example embodiment, the response is an ACK or a NAK. As discussed above, a NULL state occurs when, due to incorrect reception of the control channel at the mobile station, neither an ACK nor a NAK is actually transmitted. If the feedback from the mobile station indicates an error in the transmission (in this example, due to an error on either the control or data channel), a first-subpacket error has occurred. Proceed to step 730. If no error has occurred, the packet transmission is deemed successful. Proceed to step 720.

In step 720, the first subpacket was successful, so the margin m will be reduced. To drive the first subpacket error rate towards the targeted first subpacket error rate, $s_1$, m is reduced by the ratio $s_1/(1-s_1)$ multiplied by a factor x. Proceed to step 725. In step 730, a first subpacket error has occurred. The control loop will increase m by the factor x. Thus, the control loop drives the first subpacket error rate by increasing by the factor x when an error occurs, which may typically be designed such that the next first subpacket transmission will be successful, then steps the margin down for successful subsequent first subpacket transmissions by the factor including the targeted error rate. Proceed to step 735.

In either step 725 or step 735, a change in m may be limited to a window surrounding the current value bounded by a and b. These windowing steps are optional. From step 725, following a successful packet transmission, proceed to decision block 770 to determine if additional packets are to be sent to the mobile station. From step 735, following an unsuccessful first subpacket transmission attempt, proceed to step 740.

In step 740, transmit the next subpacket, in similar fashion to that described in step 710. Then proceed to decision block 745, where feedback from the mobile station indicates whether or not the subpacket transmission was successful, similar to decision block 715. If an error occurred, proceed to decision block 750 to determine if additional retransmissions, i.e. more subpackets, can be sent. As described above, any number of re-transmissions may be permitted. If the limit of re-transmissions has not been met, return to step 740 to transmit the next subpacket. If the limit has been met, proceed to step 755.

If, in decision block 745, no error was reported, then the packet was successfully transmitted. In similar fashion to the control of the first sub-packet error rate, described with respect to steps 715-735, above, steps 755-765 can be used to drive the packet error rate to the targeted error rate, $s_2$. In step 760, reduce m by the ratio $s_2/(1-s_2)$ multiplied by a factor y. In step 755, the number of re-transmission attempts has expired without a successful transmission, so a packet error has occurred. Increase m by the factor y. From either step 755 or step 760, proceed to step 765.

In step 765, the adjustment to m can be limited to the window surrounding the current value of m bounded by c and d. This windowing is optional. Proceed to decision block 770.

In decision block 770, the prior packet has been transmitted, using one or more subpackets, and may have been successful or resulted in error. If there are additional packets to send, proceed to step 710 to repeat the steps just described. If not, the process can stop. The process can loop indefinitely, for as long as the base station needs to maintain a margin loop associated with the mobile station.

In a system in which a control channel is transmitted along with the data channel, i.e. the PDCCH, it may be important for the control channel to be received reliably as well as the data channel. One solution is to transmit the control channel at a constant power level, computed to meet the expected worst-case situation. This solution is non-optimal, as a portion of the available transmit power will be underutilized in non-worst-case environments. The control loop described above with respect to FIG. 7 can be used to generate a margin value for use on both the control and data channels. An offset value may be added to or subtracted from the margin to produce the desired transmit power level of the control channel, which will track with the updating of the margin in response to packet data transmission. However, it may be desirable to use two loops to control two margin values, one for each channel. In this example, margin m, controlled by a process such as that shown in FIG. 7, can be used for scheduling on the data channel. A separate control loop can be run in parallel to update a second margin, $m_2$.

Figure 8:
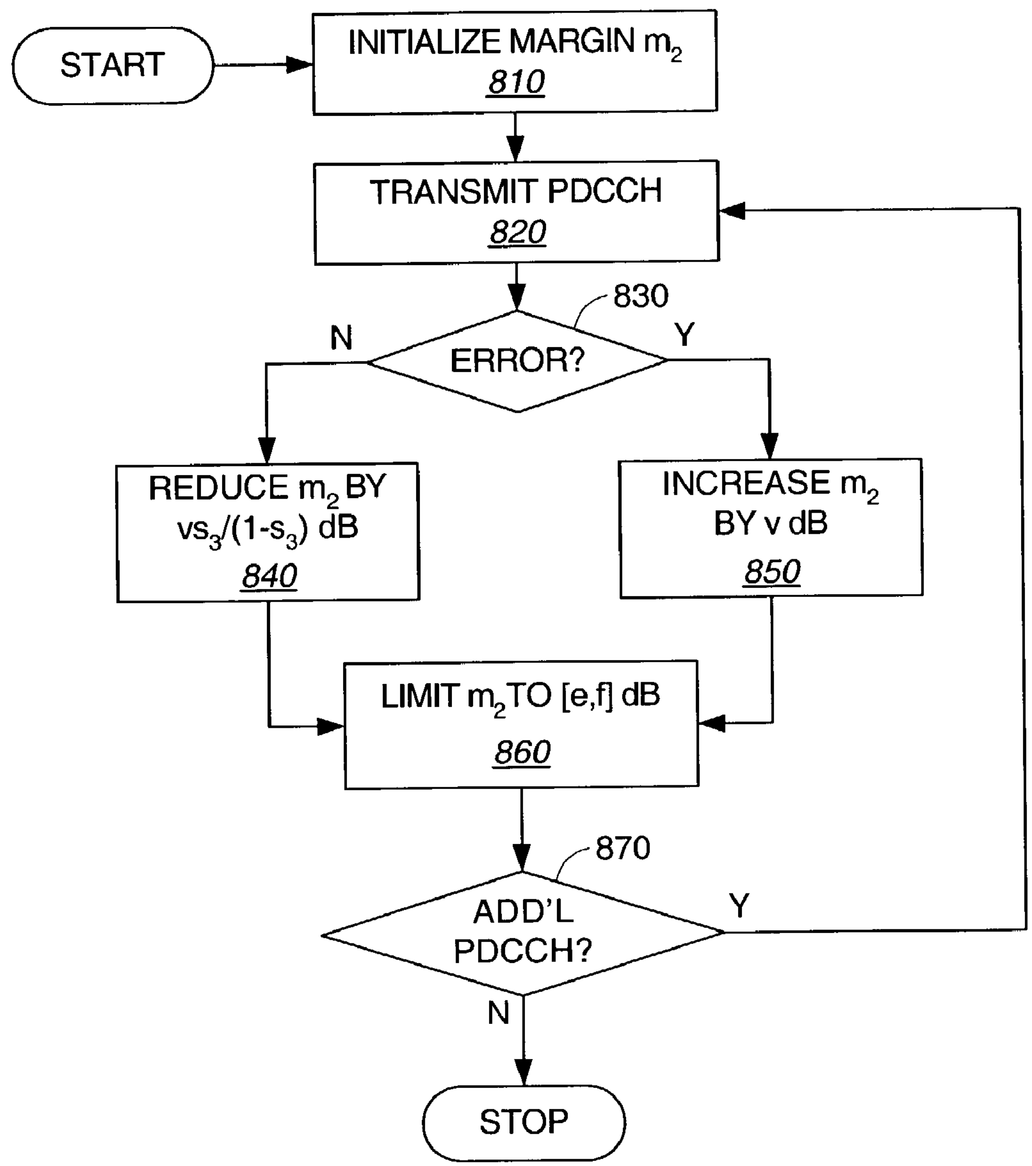
FIG. 8 depicts a flowchart of an example embodiment of a control channel outer control loop.

FIG. 8 depicts a flowchart of an example embodiment of a control channel outer control loop. The control loop is used to dynamically update a margin value, $m_2$, in response to feedback from a mobile station. The process may be parameterized through the use of several variables. Variable $s_3$ is the targeted control channel error rate. Variables e and f are lower and upper bounds, respectively, used to provide a window for limiting the instantaneous change in the margin, $m_2$. Variable v is a factor for scaling the amount of increase or reduction of $m_2$ based on mobile station feedback. Margin $m_2$ may be used to determine the appropriate power level for transmitting the control channel.

The process starts in step 810, where margin $m_2$ is initialized. Any initialization procedure can be used to determine the initial value of $m_2$ within the scope of the present invention. For example, the initialization value may be set to a pre-determined value, or calculated in response to the current channel conditions, such as given by the most recent C/I value, or measurements of the reverse link power. Proceed to step 820.

In step 820, the control channel, the PDCCH in this example, is transmitted. Proceed to decision block 830 to determine if an error occurred on the control channel, using feedback from the mobile station. As discussed above, if a mobile station does not correctly receive the control channel, it may not demodulate the data channel when data is directed to the mobile station. In such a case, neither an ACK nor a NAK will be generated in response. The identification of the NULL state can be used to signify an error on the control channel. If an error is identified, proceed to step 850. If no error is indicated, proceed to step 840.

Steps 840 and 850 can be used to drive the control channel error rate to the desired target, $s_3$. In step 840, when no error occurred, reduce $m_2$ by the ratio $s_3/(1-s_3)$ multiplied by a factor v. In step 850, when an error occurred, increase $m_2$ by the factor v. From either step 840 or 850 proceed to step 860.

In step 860, the adjustment to $m_2$ may be limited to the window surrounding the current value of $m_2$ bounded by e and f. This windowing is optional. Proceed to decision block 870.

In step 870, if additional control channel information is to be sent, in this example, on the PDCCH, proceed back to step 820 to continue the control loop. If not, the process can stop.

As described above, the number of outer control loops deployed is not limited to one, as in FIG. 7, or two, as described above with respect to the combination of loops depicted in FIGS. 7-8. Any number of control loops can be deployed to control any number of margin values. For example, multiple data transmission formats may be supported for transmission on the forward channel. Different transmission formats may require differing margin requirements for the same channel quality. One or more margins can be deployed for use with various formats or groups of formats. Those of skill in the art will readily adapt the principles disclosed herein to provide control of margins for any number of channels, channel types, and supported formats within in a channel.

Depending on the configuration of parameters selected for a control loop, such as the example outer control loop depicted in FIG. 7, the steady state packet error rate may be driven to a value that is below the targeted error rate, $s_2$ for example. If the error rate is too high, the loop will drive it down. However, if the error rate is too low, it may take a relatively long period of time to increase since the occurrence of final packet errors is infrequent. This may be desirable, if the throughput of the system is improved by the reduction of retransmissions required in such a scenario. The packet error rate may approach the desired overall packet rate, given by $s_2$, although with a very low packet error rate, such convergence may take some time, as discussed above. In other circumstances, it may be desirable to deploy an outer control loop that tracks specifically to a desired overall packet error rate, while still maintaining the responsiveness to changes in channel condition as described with respect to the embodiments above.

Figure 9:
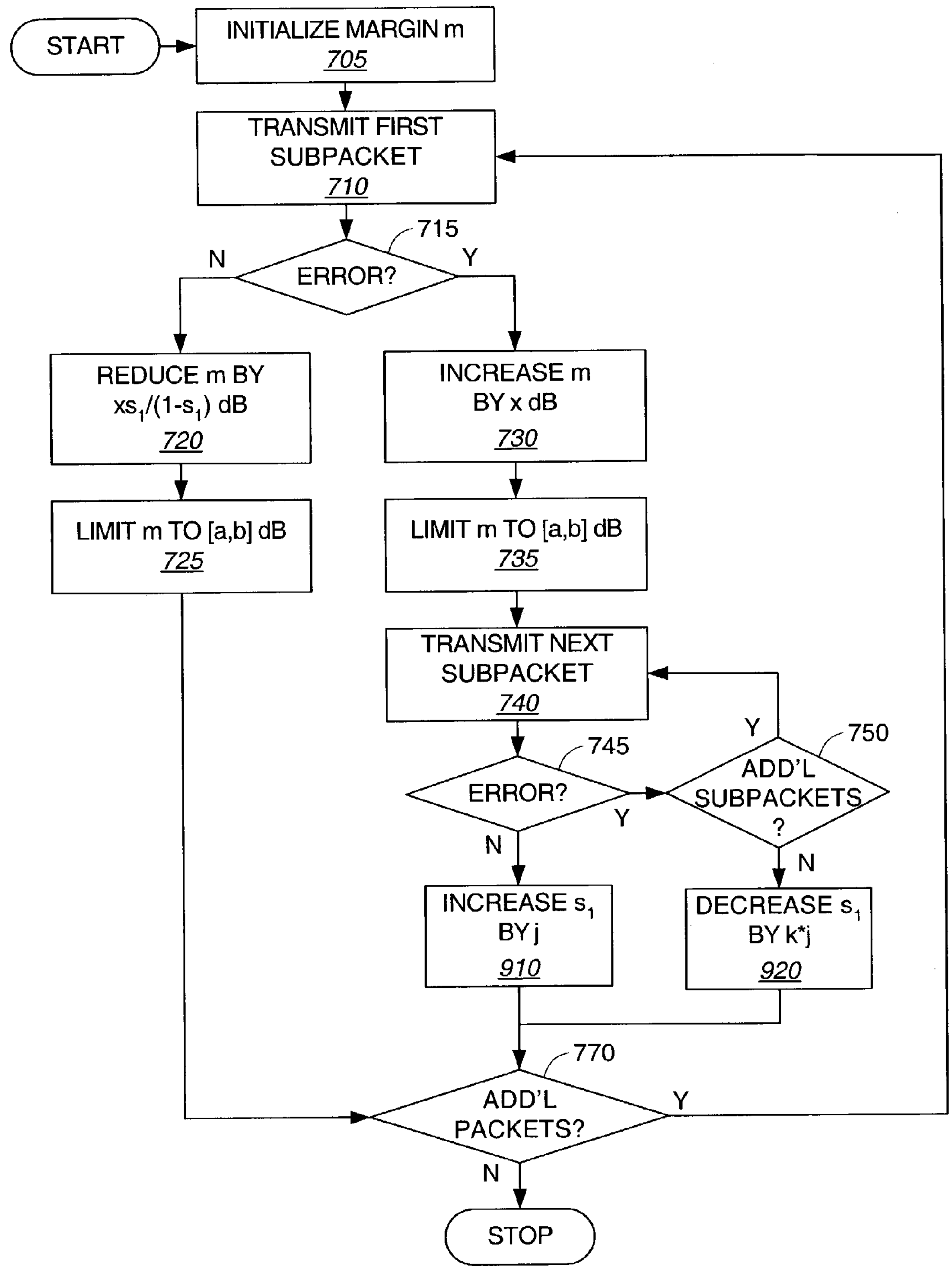
FIG. 9 depicts a flowchart of an example embodiment of an outer-outer control loop.

An example embodiment of such a control loop is referred to herein as an outer-outer control loop. FIG. 9 depicts a flowchart of an example embodiment of an outer-outer control loop. In this embodiment, an outer loop is used to drive the first subpacket error rate to a rate $s_1$. This loop is similar to the first portion of the embodiment depicted in FIG. 7. However, rather than having $s_1$ controlled directly, the embodiment of FIG. 7 is modified to include an outer-outer control loop that updates $s_1$ to arrive at the desired packet error rate, as shown in FIG. 9. In this example, parameters k and j are set to produce the desired overall packet error rate, and the outer-outer loop controls the first subpacket error rate accordingly. Therefore, since first subpacket errors drive the margin control portion of the loop, the outer-outer loop is still responsive to changes in the channel conditions, as was the case with the embodiment shown in FIG. 7. In this embodiment, however, the overall error rate will be driven to the desired error rate Steps that are unchanged from FIG. 7 are identified by like reference numbers. Steps 910 and 920 are included, as shown, to provide the outer control of the outer loop, i.e. the outer-outer control. One margin, m, is controlled by this control loop. As described above, m may be used to control more than one channel, such as a control and data channel. Alternatively, additional control loops can be provided in parallel, as described with respect to FIG. 8. Any number of loops can be deployed in parallel, including outer control loops as described in FIG. 7 or FIG. 8, as well as outer-outer control loops as described with respect to FIG. 9.

In FIG. 9, the process begins in step 705, where margin m is initializes. In addition, an initial value for $s_1$ is initialized. Steps 705-750 operate substantially as described above with respect to FIG. 7. The first subpacket error rate is controlled in accordance with rate $s_1$, using the same ratio, factor x, and window limits a and b (if optionally included) as described above. However, margin m is not updated in response to subpackets subsequent to the first subpacket. Instead, the rate $s_1$ is increased or decreased depending on the success or failure, respectively, of a subsequent subpacket. If a subsequent subpacket is received correctly, step 910 will be reached from decision block 745. In step 910, $s_1$ is increased by factor j, which may be a pre-determined variable. Thus, the first subpacket error rate for subsequent packets will be increased. If a subpacket, subsequent to the first subpacket, is not received successfully, step 920 will be reached from decision block 750. In step 920, $s_1$ is decreased by factor k*j, where k may be a pre-determined variable. Thus, the first subpacket error rate for subsequent packets will be decreased. The parameters j and k determine the up and down step size of the first subpacket error rate $s_1$, and also determine the resultant overall packet error rate. For example, j and k may be selected to produce an overall packet error rate of 1%. The first subpacket error rate, $s_1$, will vary accordingly.

It should be noted that in all the embodiments described above, method steps can be interchanged without departing from the scope of the invention. The descriptions disclosed herein have in many cases referred to signals, parameters, and procedures associated with the 1×EV-DV standard, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, operable with a transmitter for transmitting packets, each packet transmitted in one or more subpackets, comprising:

a receiver for receiving an error message in response to a subpacket transmission; and a processor for:

increasing a power margin by a first value determined in accordance with a first subpacket error rate when the error message indicates the first subpacket was received in error; and decreasing the power margin by a second value when the error message indicates the first subpacket was received without error.

2. The apparatus of claim 1, further comprising a scheduler for determining a transmission format in response to a received channel quality indicator and the power margin.

3. The apparatus of claim 2, wherein the received channel quality indicator values are filtered.

4. The apparatus of claim 2, wherein:

the receiver further receives a pilot signal from a wireless communication device; and the scheduler schedules a transmission to the wireless communication device only when the received pilot signal energy exceeds a predetermined threshold.

5. The apparatus of claim 1, wherein the second value is determined in accordance with the first subpacket error rate.

6. The apparatus of claim 1, wherein the first value is a predetermined parameter x, and the second value is computed as:

$$\frac{x \cdot s}{1 - s}$$

wherein s is the first subpacket error rate.

7. The apparatus of claim 1, wherein the processor further limits the increase of the power margin to a predetermined upper limit.

8. The apparatus of claim 1, wherein the processor further limits the decrease of the power margin to a predetermined lower limit.

9. The apparatus of claim 1, wherein the processor further:

decreases the power margin by a third value when the error message indicates a subpacket, other than the first subpacket, was received without error; and increases the power margin by a fourth value when the error message indicates the final subpacket was received in error.

10. The apparatus of claim 9, wherein the third value is determined in accordance with a packet error rate.

11. The apparatus of claim 9, wherein the fourth value is determined in accordance with a packet error rate.

12. The apparatus of claim 9, wherein the fourth value is a predetermined parameter y, and the third value is computed as:

$$\frac{y \cdot s_2}{1 - s_2}$$

wherein $s_2$ is a packet error rate.

13. The apparatus of claim 6, wherein the processor further:

increases s by a fifth value when the error message indicates a subpacket, other than the first subpacket, was received without error; and decreases s by a sixth value when the error message indicates the final subpacket was received in error.

14. The apparatus of claim 13, wherein the fifth and sixth values are determined in accordance with a packet error rate.

15. The apparatus of claim 1, further operable with a transmitter for transmitting a control packet, wherein:

the receiver further receives a control error message; and the processor increases a control margin when the control error message indicates the control channel was received in error and decreases the control margin when the control error message indicates the control channel was received without error.

16. The apparatus of claim 15, wherein:

the receiver further receives a pilot signal; and the processor determines the control error message indicates an error when the pilot signal energy does not exceed a predetermined threshold, irrespective of the value of the received control error message.

17. A wireless communication device, operable with a transmitter for transmitting packets, each packet transmitted in one or more subpackets, comprising:

a receiver for receiving an error message in response to a subpacket transmission; and a processor for:

increasing a power margin by a first value determined in accordance with a first subpacket error rate when the error message indicates the first subpacket was received in error; and decreasing the power margin by a second value when the error message indicates the first subpacket was received without error.

18. A wireless communication system, including a wireless communication device operable with a transmitter for transmitting packets, each packet transmitted in one or more subpackets, comprising:

a receiver for receiving an error message in response to a subpacket transmission; and a processor for:

increasing a power margin by a first value determined in accordance with a first subpacket error rate when the error message indicates the first subpacket was received in error; and decreasing the power margin by a second value when the error message indicates the first subpacket was received without error.

19. A method of margin control, comprising:

receiving an error message in response to a subpacket transmission;

increasing a power margin by a first value determined in accordance with a first subpacket error rate when the error message indicates the first subpacket was received in error; and decreasing the power margin by a second value when the error message indicates the first subpacket was received without error.

20. The method of claim 19, further comprising:

receiving a channel quality indicator; and determining a transmission format in response to the received channel quality indicator and the power margin.

21. The method of claim 20, further comprising filtering the received channel quality indicator values.

22. The method of claim 20, further comprising:

receiving a pilot signal; and scheduling a transmission only when the received pilot signal energy exceeds a predetermined threshold.

23. The method of claim 19, wherein the second value is determined in accordance with the first subpacket error rate.

24. The method of claim 19, wherein the first value is a predetermined parameter x, and the second value is computed as:

$$\frac{x \cdot s}{1 - s}$$

wherein s is the first subpacket error rate.

25. The method of claim 19, further comprising limiting the increase of the power margin to a predetermined upper limit.

26. The method of claim 19, further comprising limiting the decrease of the power margin to a predetermined lower limit.

27. The method of claim 19, further comprising:

decreasing the power margin by a third value when the error message indicates a subpacket, other than the first subpacket, was received without error; and increasing the power margin by a fourth value when the error message indicates the final subpacket was received in error.

28. The method of claim 27, wherein the third value is determined in accordance with a packet error rate.

29. The method of claim 27, wherein the fourth value is determined in accordance with a packet error rate.

30. The method of claim 27, wherein the fourth value is a predetermined parameter y, and the third value is computed as:

$$\frac{y \cdot s_2}{1 - s_2}$$

wherein $s_2$ is a packet error rate.

31. The method of claim 24, further comprising:

increasing s by a fifth value when the error message indicates a subpacket, other than the first subpacket, was received without error; and decreasing s by a sixth value when the error message indicates the final subpacket was received in error.

32. The method of claim 31, wherein the fifth and sixth values are determined in accordance with a packet error rate.

33. The method of claim 19, further comprising:

receiving a control error message in response to a transmitted control packet;

increasing a control margin when the control error message indicates the control channel was received in error; and decreasing the control margin when the control error message indicates the control channel was received without error.

34. The method of claim 33, further comprising:

receiving a pilot signal; and determines the control error message indicates an error when the pilot signal energy does not exceed a predetermined threshold, irrespective of the value of the received control error message.

35. An apparatus, comprising:

means for receiving an error message in response to a subpacket transmission;

means for increasing a power margin by a first value determined in accordance with a first subpacket error rate when the error message indicates the first subpacket was received in error; and means for decreasing the power margin by a second value when the error message indicates the first subpacket was received without error.

36. The apparatus of claim 35, further comprising:

means for decreasing the power margin by a third value when the error message indicates a subpacket, other than the first subpacket, was received without error; and means for increasing the power margin by a fourth value when the error message indicates the final subpacket was received in error.

37. The apparatus of claim 35, further comprising:

means for receiving a control error message in response to a transmitted control packet;

means for increasing a control margin when the control error message indicates the control channel was received in error; and means for decreasing the control margin when the control error message indicates the control channel was received without error.

38. A wireless communication system, comprising:

means for receiving an error message in response to a subpacket transmission;

means for increasing a power margin by a first value determined in accordance with a first subpacket error rate when the error message indicates the first subpacket was received in error; and means for decreasing the power margin by a second value when the error message indicates the first subpacket was received without error.

39. The wireless communication system of claim 38, further comprising:

means for decreasing the power margin by a third value when the error message indicates a subpacket, other than the first subpacket, was received without error; and means for increasing the power margin by a fourth value when the error message indicates the final subpacket was received in error.

40. The wireless communication system of claim 38, further comprising:

means for receiving a control error message in response to a transmitted control packet;

means for increasing a control margin when the control error message indicates the control channel was received in error; and means for decreasing the control margin when the control error message indicates the control channel was received without error.

41. A computer readable medium encoded with instructions capable of being executed by a computer to perform the following steps:

receiving an error message in response to a subpacket transmission;

increasing a power margin by a first value determined in accordance with a first subpacket error rate when the error message indicates the first subpacket was received in error; and decreasing the power margin by a second value when the error message indicates the first subpacket was received without error.

42. The computer readable medium of claim 41, further encoded with instructions to perform the following steps:

decreasing the power margin by a third value when the error message indicates a subpacket, other than the first subpacket, was received without error; and increasing the power margin by a fourth value when the error message indicates the final subpacket was received in error.

43. The computer readable medium of claim 41, further encoded with instructions to perform the following steps:

receiving a control error message in response to a transmitted control packet;

increasing a control margin when the control error message indicates the control channel was received in error; and decreasing the control margin when the control error message indicates the control channel was received without error.

* * * * *